(No Model.)
A. J. MOXHAM.
GATE VALVE.
No. 605,968. Patented June 21, 1898.
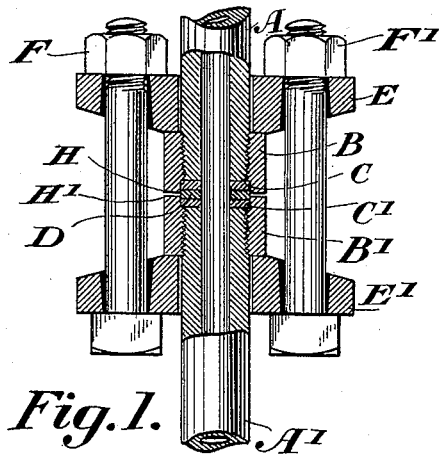
Fig. 1.
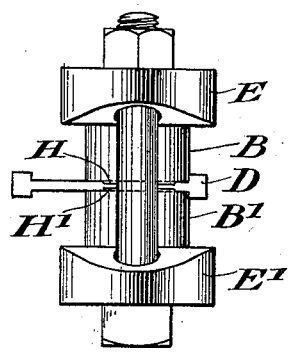
Fig. 2.
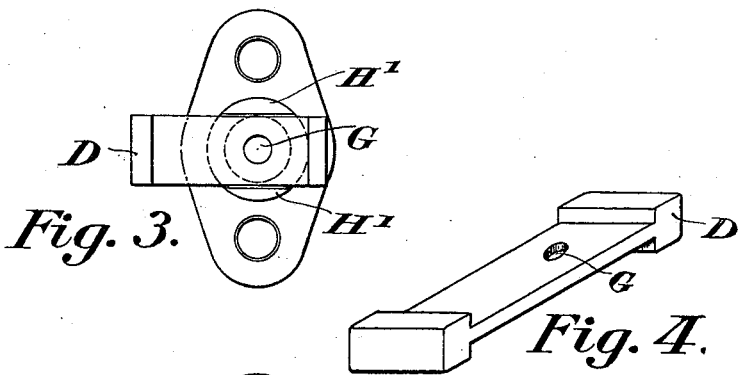
Fig. 3.
Fig. 4.
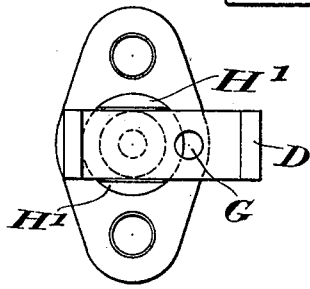
Fig. 5.
WITNESSES:
Myrtle E. Sharpie
K. G. Barclay
INVENTOR
A. J. Moxham
BY
Richard Eyre
ATTORNEY.
THE NORRIS PETERS CO., PHOTO-LITHO., WASHINGTON, D. C.

UNITED STATES PATENT OFFICE.

ARTHUR J. MOXHAM, OF LORAIN, OHIO, ASSIGNOR TO THE COCHRAN COMPANY, OF SAME PLACE.

GATE-VALVE.

SPECIFICATION forming part of Letters Patent No. 605,968, dated June 21, 1898.

Application filed December 15, 1897. Serial No. 661,989. (No model.)

*To all whom it may concern:*

Be it known that I, ARTHUR J. MOXHAM, a subject of the Queen of Great Britain, residing at Lorain, Lorain county, Ohio, have invented a certain new and useful Gate-Valve, of which the following is a specification.

My invention relates to gate-valves; and it is the object of my invention to provide a valve which is simple and economical in construction and operation and at the same time durable and efficient, and especially applicable for use in conjunction with high-pressure systems, such as one connected with refrigerating machinery, using carbonic acid as the active element. To this end I place between the ends of two pipes a pair of soft annular gaskets, and between these I place a gate having a suitable opening adapted to register with the orifices of the pipes and gaskets. I also provide means for guiding the movement of the slide and for thoroughly closing up the joints between the various parts so as to prevent leakage.

My invention therefore consists of the novel construction, arrangement, and combination of parts, which will be hereinafter described and claimed, due reference being had to the drawings.

Referring to the said drawings, Figures 1 and 2 are respectively sectional and end views of a valve embodying the features of my invention. Figs. 3 and 5 are plan views of the lower part of the valve, Fig. 3 showing the valve open and Fig. 5 showing it closed. Fig. 4 is a view of the gate.

A and A' are two contiguous pipes between which the gate is to be placed. The ends of these pipes after cutting are smoothly finished by a suitable tool and are preferably scored to more intimately engage the gaskets, so as to prevent leakage.

B and B' are collars screwed to the threaded ends of the pipes A and A'.

C and C' are gaskets, preferably of lead or other easily-compressible material.

D is the gate, having the opening G. The gate is placed between the two gaskets, each of the latter being held against the end of one of the pipes. The collars B and B' are recessed, as shown, so that they may engage the outside of the gasket and prevent undue flowing thereof. Extending from the ends of these collars are the projections H and H', between which rests and is guided in its travel the gate D. The collars B and B' are engaged by flanges E and E', and these are drawn toward each other by means of the bolts and nuts F and F', compressing the gaskets in their movement.

The valve is shown as opened in Fig. 3. To close it, the end of the gate D is tapped with a hammer, or, if desired, special means may be supplied for changing its position to that shown in Fig. 5.

It is of course clear that my invention is not limited to the precise details which I have shown and described, as equivalent means for obtaining the pressure, guiding the gate in its movement, &c., will readily suggest themselves to those skilled in the art.

I desire especially to point out that the arrangement of gaskets and gate shown may readily be used with special fittings instead of the pipes A and A'. In this case the collars might be dispensed with entirely, the fittings being conformed so as to serve the same purpose.

Having thus fully described my invention, what I claim, and desire to protect by Letters Patent, is—

1. The combination in a gate-valve, of the pipes A and A', the annular gaskets, the gate, the collars engaging the pipes and the gaskets, the flanges E and E', and the bolts connecting said flanges.

2. A gate-valve comprising the combination of the pipe ends, a gasket bearing against each of the same, a collar secured to each pipe, an annular recess in each collar engaging the periphery of one of the gaskets, projections H and H' on the collars forming a guideway, a gate having an orifice and sliding in said guideway, flanges engaging said collars, and bolts and nuts connecting said flanges.

In testimony whereof I have affixed my signature in presence of two witnesses.

ARTHUR J. MOXHAM.

Witnesses:
MYRTLE E. SHARPE,
H. W. SMITH.